(12) United States Patent
Lee et al.

(10) Patent No.: US 9,306,421 B2
(45) Date of Patent: Apr. 5, 2016

(54) CORE FORMED FROM POWDER AND MOTOR FOR VEHICLE USING THE SAME

(75) Inventors: Jae Ryung Lee, Gyeonggi-do (KR); Seong Jin Kim, Gyeonggi-do (KR); Shin Gyu Kim, Gyeonggi-do (KR); Kun Min Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 727 days.

(21) Appl. No.: 13/524,305

(22) Filed: Jun. 15, 2012

(65) Prior Publication Data

US 2013/0147287 A1 Jun. 13, 2013

(30) Foreign Application Priority Data

Dec. 8, 2011 (KR) .................. 10-2011-0130841

(51) Int. Cl.
*H02K 1/02* (2006.01)
*H02K 1/14* (2006.01)
*B22F 7/08* (2006.01)
*B22F 1/02* (2006.01)
*C22C 33/02* (2006.01)

(52) U.S. Cl.
CPC *H02K 1/148* (2013.01); *B22F 7/08* (2013.01); *B22F 1/02* (2013.01); *C22C 33/02* (2013.01); *C22C 2200/02* (2013.01); *H02K 2213/03* (2013.01)

(58) Field of Classification Search
USPC .................................................... 310/43, 44
See application file for complete search history.

(56) References Cited

U.S. PATENT DOCUMENTS

| 2003/0214197 A1* | 11/2003 | De Luca et al. ............... 310/218 |
| 2004/0108782 A1* | 6/2004 | Enomto et al. ........... 310/156.43 |
| 2004/0174087 A1* | 9/2004 | Heidrich ....................... 310/218 |
| 2006/0022550 A1* | 2/2006 | Otsuji ............................ 310/216 |
| 2009/0242825 A1* | 10/2009 | Ohwaki et al. .............. 252/62.54 |

FOREIGN PATENT DOCUMENTS

| JP | 2004-040948 A | 2/2004 |
| JP | 2004040948 A | 2/2004 |
| JP | 2007-068330 A | 3/2007 |
| JP | 2007068330 A | 3/2007 |
| JP | 2008-022593 A | 1/2008 |
| JP | 2008022593 A | 1/2008 |
| KR | 10-2007-0112524 A | 11/2007 |
| KR | 10-2011-0041712 | 4/2011 |
| KR | 10-2011-0041712 A | 4/2011 |

* cited by examiner

*Primary Examiner* — Naishadh Desai
(74) *Attorney, Agent, or Firm* — Mintz Levin Cohn Ferris Glovsky and Popeo, P.C.; Peter F. Corless

(57) ABSTRACT

A core formed from powder, such as a stator core for use in a motor for a vehicle, wherein the core is formed from metallic powder and includes an outer part disposed at an inside of the motor, an inner part disposed at an inside of the motor, and a winding part which connects the outer part and the inner part and on which a wire is wound, and to a motor for a vehicle using the same. The winding part is formed to have rounded corners and a height lower than the height of the inner part, and a connection part is obliquely formed between the winding part and the inner part so that the winding part and the inner part are naturally connected.

6 Claims, 6 Drawing Sheets

CORE FORMED FROM POWDER AND MOTOR FOR VEHICLE USING THE SAME

CROSS-REFERENCE TO RELATED APPLICATIONS

The present application claims priority to Korean Patent Application No. 10-2011-0130841 filed on Dec. 8, 2011, the entire contents of which is incorporated herein by reference.

BACKGROUND OF THE INVENTION

1. Field of the Invention

The present invention relates to a core, particularly a core for a motor, formed from powder which has a high degree of freedom of shape (i.e. which can be formed into a wide variety of shapes), and to a motor for a vehicle using the core. The core can beneficially be used in place of a conventional electric steel plate.

2. Description of the Related Art

Because an increasing number of vehicles are manufactured to be electrically operated and be more environmentally friendly, conventional vehicle systems that have been driven by hydraulic pressure have developed into systems that are electrically driven. This has caused an increase in the type and number of motors that are used in vehicles. For example, high-grade vehicles may have as many as 100 or more motors.

As the demand for motors has increased in this way, motors are also required to be smaller and more lightweight. For instance, the size and weight of motors have been reduced in such a manner that conventional DC motors are either structurally changed into BLDC ("brushless DC") motors or high-performance magnets are utilized. Furthermore, high frequency and high rotation of vehicle use may contribute to a further need to increase the output of the motor and to decrease the size further.

FIG. 1 shows a conventional motor for vehicles, and FIG. 2 shows a stator core used in the motor of FIG. 1. Conventionally, a core 30 which constitutes a large volume of a motor 70 comprises a laminated electric steel plate 32. The high flux density, high permeability and high strength of this electric steel plate 32 provide advantages, and, thus, it is widely applied to a core 30 of a motor for vehicles.

However, the electric steel plate 32 is problematic because only a 2D magnetic circuit is formed and the degree of freedom of shape is low. Upon designing the motor 70, the confined structure of the electric steel plate 32 cannot be easily applied. For example, the core 30 comprising the electric steel plate is configured such that a rotor 10 is positioned in the core 30 and a wire 60 is wound on the outer surface thereof. As such, wound wire may be disposed on the outer surface of the core at a height that increases the core size, and as a result the axial length of the motor may increase.

Further, the type of wire 60 typically used is a copper (Cu) wire, which is expensive and has a high density. As a result, use of wound Cu wire can result in an increase in cost and weight.

Further, the conventional electric steel plate 32 has a low degree of freedom of shape, such that an electric steel plate 32 is generally formed with undesirably sharp corners. These sharp corners can cause the coating of the wire 60 to undesirably peel off. To prevent this peeling, an insulating part, such as an insulator 50, is additionally attached to the outer surface of the core 30 to prevent the coating of the wire from peeling off.

This related art is merely utilized to enhance understanding about the background of the present invention, and should not be regarded as conventional techniques known to those having ordinary knowledge in the art.

SUMMARY OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Accordingly, the present invention has been made keeping in mind the above problems encountered in the related art, and an object of the present invention is to provide a core formed from powder and a motor for a vehicle using the same. In particular, according to embodiments of the present invention, the core is formed from isotropic powder having a high degree of freedom of shape. The isotropic powder is used to form a core for a motor so as to provide a small and light-weight motor, and to reduce the use of wire. According to various embodiments, a copper (Cu)-aluminum (Al) wire is used rather than a pure copper (Cu) wire, thus reducing the weight of the wire significantly (e.g. by amounts up to 50% and greater depending on the relative amounts of Cu and Al).

In order to accomplish the above objects, the present invention provides a core formed from powder. According to embodiments of the invention, the core can be a stator core for use in a motor for a vehicle. In various embodiments, the core is formed from metallic powder and comprises an outer part disposed at an inside of the motor, an inner part disposed at an inside of the motor, and a winding part which connects the outer part and the inner part and on which a wire can be wound. The winding part can beneficially be formed to have round corners and a height lower than a height of the inner part. A connection part can further be obliquely formed between the winding part and the inner part so that the winding part and the inner part are connected.

According to an exemplary embodiment, the core may be formed from metallic powder comprising pure iron particles having a size of about 50~200 an coated with a layer of phosphate at a thickness of 100 nm or less (not including zero). According to various embodiments, the core may be formed by a molding process. According to an exemplary embodiment, the core is formed by subjecting a metallic powder and a lubricant (e.g. a polyamide-based lubricant) to press molding carried out under suitable conditions, such as at a temperature of about 70~100° C. and an applied pressure of about 7~11 ton/cm$^2$. After press molding, thermal treatment can be carried out at a suitable heightened temperature, such as about 500~600° C., for about 20~60 min.

The thus formed core may in some embodiments have a density of about 7~8 g/cc, and a partial density difference may be less than about 0.05 g/cc (not including zero).

According to embodiments of the invention, the winding part may be formed to have a circular or oval cross-section. However, other geometries can also suitably be used, wherein the outer surface is smooth, and preferably is rounded.

The height of the winding part is preferably greater than the height of the inner part, and in various embodiments, the height of the winding part may be at least 0.7 times the height of the inner part.

According to embodiments of the invention, the height of the outer part may be equal to or greater than the height of the winding part, and may be lower than the height of the inner part.

In addition, the present invention provides a motor for a vehicle, comprising a stator core, which is formed from metallic powder. According to various embodiments, the core comprises an outer part disposed at an inside of the motor, an inner part disposed at an inside of the motor, and a winding part which connects the outer part and the inner part and on which a wire is wound. The winding part may be formed to have round corners and a height lower than a height of the inner part, and a connection part is formed between the winding part and the inner part so that the winding part and the inner part are connected. Preferably, the connection part is obliquely formed between the winding part and the inner part. According to some embodiments, a wire wound on the winding part of the core comprises a combination of aluminum and copper, preferably an aluminum wire with a copper strip formed around the aluminum wire.

According to various embodiments, the wire may include about 15~30 vol % of copper based on the total wire composition.

The wire may be formed by providing the copper strip around the aluminum wire and attaching opposite ends of the copper strip using a suitable method such as welding.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, a core formed from powder and a motor for a vehicle using the same according to preferred embodiments of the present invention will be described in detail while referring to the appended drawings.

Figure 1:
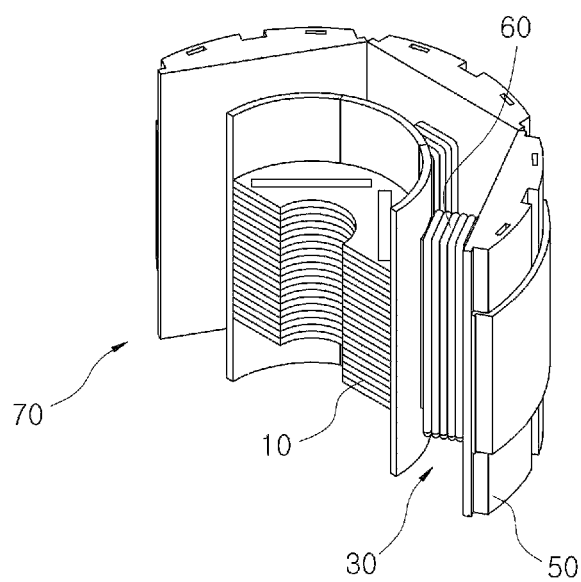
FIG. 1 is a view showing a conventional motor for a vehicle.
Figure 2:
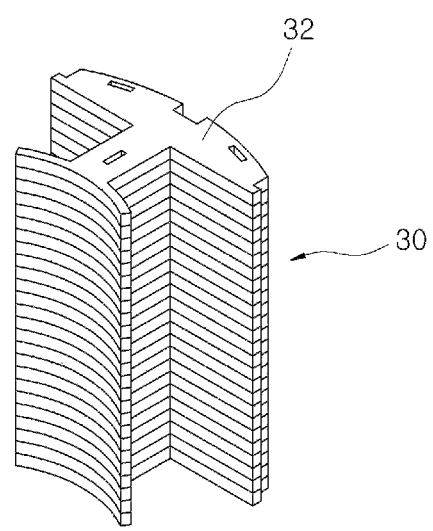
FIG. 2 is a view showing a stator core used in the motor of FIG. 1.
Figure 3:
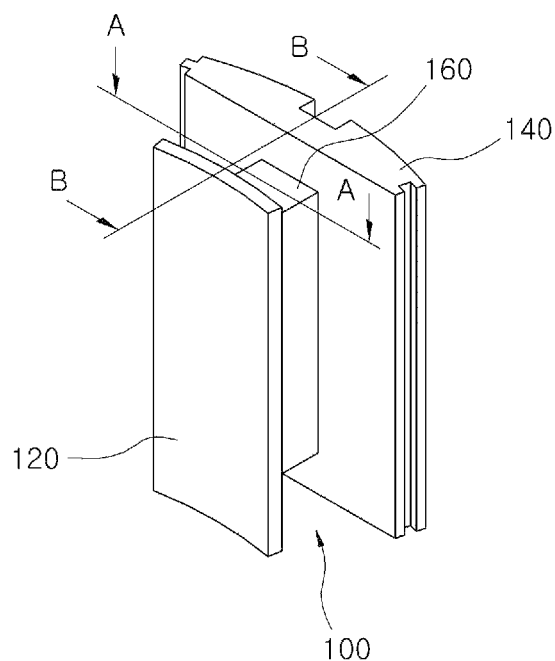
FIG. 3 is a view showing a core formed from powder according to an embodiment of the present invention.
Figure 4:
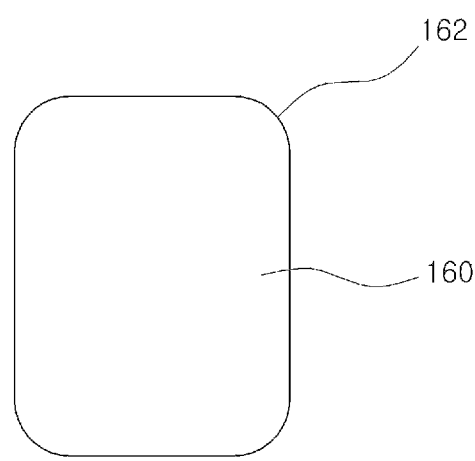
FIG. 4 is a cross-sectional view taken along the line A-A of the core of FIG. 3.
Figure 5:
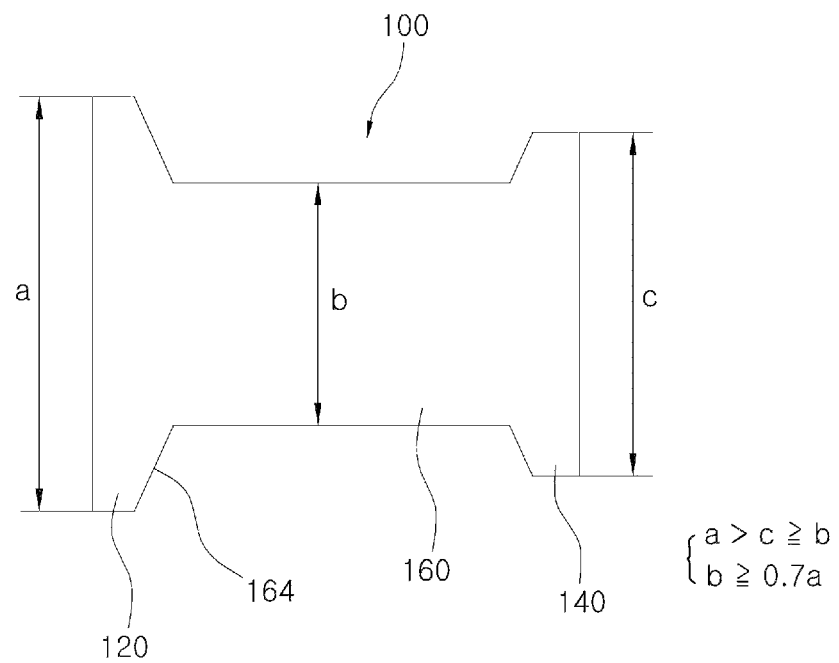
FIG. 5 is a cross-sectional view taken along the line B-B of the core of FIG. 3.

FIG. 3 is a view showing a core formed from powder according to an embodiment of the present invention, FIG. 4 is a cross-sectional view taken along the line A-A of the core of FIG. 3, and FIG. 5 is a cross-sectional view taken along the line B-B of the core of FIG. 3.

According to the present invention, the core 100 which is a stator core adapted for a motor M for a vehicle is formed from metallic powder and comprises an outer part 140 positioned at the inside of a motor M, an inner part 120 positioned at the inside of the motor, and a winding part 160 that connects the outer part 140 and the inner part 120 and on which a wire 300 is wound. As shown in FIG. 4, the winding part 160 is formed to have rounded corners 162. As shown in FIG. 5, the winding part 160 is further provided with a height "b" that is lower than the height "a" of the inner part 120, and a connection part 164 is obliquely formed between the winding part 160 and the inner part 120 so that the winding part 160 and the inner part 120 are naturally connected.

The winding part 160 may be formed to have a circular or oval cross-section, and the height b thereof may be at least 0.7 times the height a of the inner part. As shown in FIG. 5, the outer part 140 may be formed to have a height "c", wherein the height c is equal to or greater than (as in FIG. 5) the height b of the winding part 160 but which is lower than the height a of the inner part 120.

The cross-section of the core 100 formed from powder may be designed as shown in FIG. 4 using a high degree of freedom of shape of isotropic powder. Such a core may be manufactured so that the corners 162 are rounded or the cross-section thereof is circular or oval.

In contrast, a conventional electric steel plate may have sharp corners because of a low degree of freedom of shape, which can undesirably resulting in the coating of the wire peeling off. To overcome such problems, the outer surface of the core can be covered with a material such as an insulator, so that the coating of the wire is prevented from peeling off.

According to the present invention, the core formed from isotropic powder has a high degree of freedom of shape and, thus, may be designed and manufactured with rounded edges. Such a rounded structure may prevent the coating of the wire from peeling off. Further, when the wire is wound for the same number of turns, the use of the wire per turn may be decreased due to the rounded edges and, thus, a portion where the wire is exposed to the outside of the core (the "wire ending") may be shortened.

In the illustrated embodiment, the corners of a mold and a die used to conduct the molding are chamfered so that the corners of the core are rounded. According to various embodiments, the core formed from powder having the degree of freedom of shape is manufactured so that the corners 162 of the core on which the wire is wound are chamfered to be round to about 0.5 R or more. Such corners 162 can prevent the coating of the wire from peeling off and can decrease the use of the wire per turn.

To reduce the length of the wire ending and the use of the wire, the structure of the core may be designed to have the structure illustrated in FIG. 5. According to some embodiments, the core can be integrally manufactured to simplify the manufacturing process and decrease the manufacturing cost, and furthermore, high molding density of the core may be achieved and the difference in density between the different core parts may be minimized.

In the cross-section shown in FIG. 5, the height b of the winding part 160 is formed to be lower than the height a of the inner part 120. According to an exemplary embodiment, the height b of the winding part 160 may be at least 0.7 times the height a of the inner part 120. If the height ratio is less than 0.7, the difference in density between the core parts becomes large, undesirably deteriorating magnetic properties.

As shown in the drawing, the connection part 164 is obliquely formed between the winding part 160 and the inner part 120 so that they are naturally connected. If, on the other hand, the connection is orthogonal, burrs may easily form on the molding surface, which must be removed by further core processing. Further, when a magnetic path moves inwards of the motor, it is difficult to efficiently move the magnetic path because it is narrow. By forming the tilted connection part 164, the generation of burrs may be minimized, thus reducing the manufacturing cost. Also in the formation of the magnetic path wherein a magnetic field generated on the wire moves toward the core end (inwards of the motor) along the core, the pathway may become more efficient because of the wide inner part 120, thereby improving the properties of the motor.

Among the core parts, the outer part does not affect the magnetic field distribution of the core (by formation of the magnetic path) and the performance of the motor. Thus, if desired, the outer part 140 may be reduced or eliminated to decrease the weight of the core and the axial length of the motor.

Specifically, the part where the magnetic field distribution appears toward the inner part 120 is relatively enlarged, thus increasing the electromagnetic intensity formed by the wire core to thereby increase the motor torque. Such a core cannot be shaped using a conventional laminated electric steel plate. However, the formation of such a shape according to the present invention is possible due to the degree of freedom of shape of the soft magnetic powder. Thus, for example, the outer part 140, which does not aid the formation of the magnetic circuit, may be formed to have the height c which is equal to or greater than the height of the winding part 160 but is lower than the height of the inner part 120.

According to embodiments of the present invention, the core 100 formed from powder may be manufactured using metallic powder comprising pure iron particles having a size of 50~200 an and a phosphate coating to a thickness of 100 nm or less (not including zero) thereon. This core 100 may be obtained by subjecting metallic powder and a polyamide-based lubricant to press molding under suitable conditions, such as a temperature of 70~100° C. and a pressure of 7~11 ton/cm$^2$, followed by suitable thermal treatment, such as at 500~600° C. for 20~60 min.

The core thus formed has a density of 7~8 g/cc, and a partial density difference that is less than 0.05 g/cc (not including zero), thus exhibiting high performance.

Figure 6:
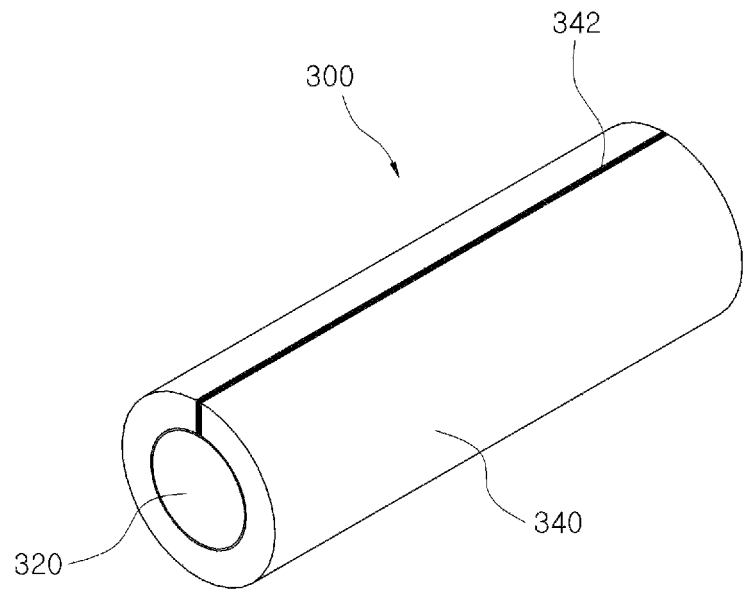
FIG. 6 is a view showing the wire of a motor for a vehicle according to an embodiment of the present invention.
Figure 7:
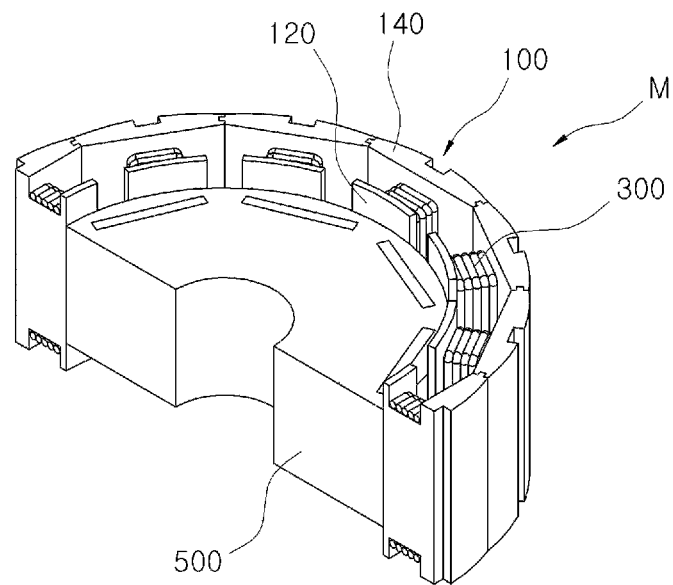
FIG. 7 is a view showing a motor for a vehicle according to an embodiment of the present invention.

FIG. 6 is a view showing the wire of a motor for a vehicle according to an embodiment of the present invention, and FIG. 7 is a view showing a motor for a vehicle according to an embodiment of the present invention.

The motor for a vehicle using the core according to an embodiment of the present invention comprises a stator core 100 which is formed from metallic powder and includes an outer part 140 positioned at the inside of the motor M, an inner part 120 positioned at the inside to of the motor, and a winding part 160 that connects the outer part 140 and the inner part 120, wherein the winding part 160 is formed to have rounded corners 162 and a height b lower than the height a of the inner part 120 and a connection part 164 is obliquely formed between the winding part 160 and the inner part 120 so that they are naturally connected; and a wire 300 wound on the winding part 160 of the core 100 and comprising an Al wire 320 and a Cu strip 340 formed around the Al wire 320. A rotor 500 is also disposed in the motor.

The wire 300 may include 15~30 vol % of Cu based on the total composition, and may be formed by providing the Cu strip 340 around the Al wire 320 and attaching opposite ends 342 of the Cu strip 340 using welding or other suitable attachment mechanism.

A CCA (Copper Clad Aluminum) wire having 15~30 vol % of Cu is, thus, manufactured. If the amount of Cu is less than 15%, electrical conductivity may drastically decrease which can undesirably deteriorate the performance of the motor. In contrast, if the amount of Cu exceeds 30%, the weight of Cu increases undesirably increasing the price of the coil. Thus, an amount of Cu more than 30% is regarded as excessive. A CCA structure for increasing electrical conductivity can be formed using an Al wire having a purity of 99.7% or more and a Cu strip having a purity of 99.9% or more. Also, the CCA wire having high Cu content may be obtained by minimizing the thermal effect of the Al wire and using a welding process that creates a thin Cu plate having uniform welding quality.

Figure 8:
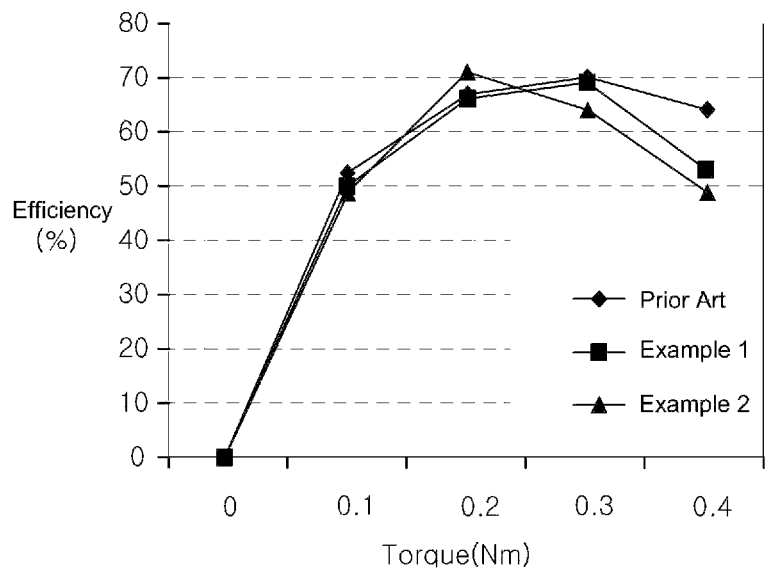
FIGS. 8 and 9 are graphs showing the performance of the motor according to the embodiment of the present invention and a conventional motor.
Figure 9:
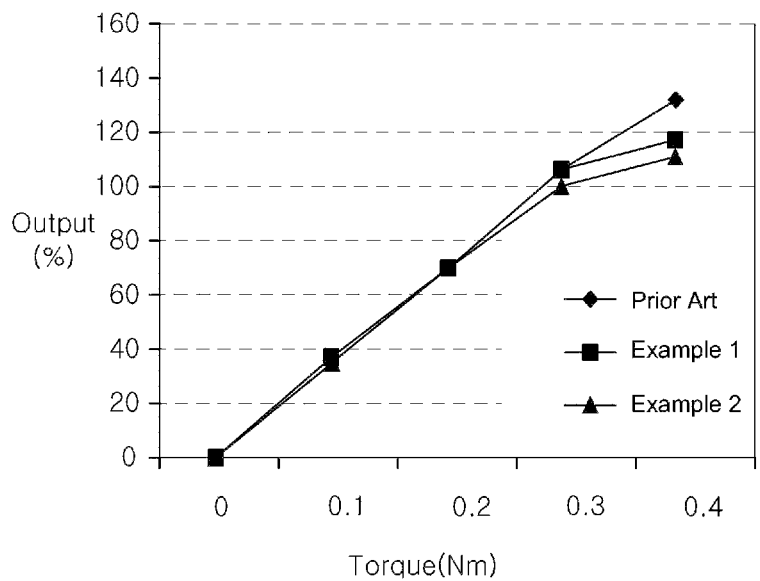

For example, a planar Cu strip 340 and the Al wire 320 are prepared, the Al wire 320 is placed on the planar Cu strip 340, and the planar Cu strip is formed around the Al by rolling. Then, TIG welding or any other suitable process is performed to connect the ends 342 of the Cu strip. According to an exemplary embodiment, the welding is carried out at 800~1000° C. at a rate of about 5 mm/s. The thus formed CCA is then used as the motor wire instead of Cu. CCA has an electrical conductivity that is 70% that of conventional Cu, and the number of turns of the wire and the diameter can, for example, be changed from Ø1.5*16 turns to Ø1.38*18.5 turns. Thus, the weight of the wire may ultimately be reduced by as much as 50% and even more. FIGS. 8 and 9 are graphs showing the performance of the motor according to the embodiment of the present invention, compared to a conventional motor, wherein Example 1 uses a general Cu wire, and Example 2 uses the wire according to the present invention. Under a torque of 0.2 Nm typically required for a motor, the performance of the motor according to the embodiment of the present invention is equal or superior to that of the conventional motor.

As described hereinbefore, the present invention provides a core formed from powder and a motor for a vehicle using the same. According to the present invention, the core formed from isotropic powder having a high degree of freedom of shape is applied to a core for a motor, thus reducing the size and weight of the motor and further reducing the amount of a wound wire.

Also, the core for a motor is designed to have a shape providing high density and can be formed from high-density soft magnetic powder using a high-density molding process. As such, the core is effective at enhancing the performance of the motor.

Furthermore, a process of forming a Cu—Al wire is provided, wherein the Cu—Al wire can be used in a motor instead of conventional Cu wires. Such a Cu—Al wire can have a weight that is reduced by up to 50% and greater.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stator core for use in a motor for a vehicle, the core formed from metallic powder and comprising an outer part disposed at an inside of the motor, an inner part disposed at an inside of the motor, a winding part which connects the outer part and the inner part, wherein the winding part has rounded corners and a height less than a height of the inner part, and a connection part connecting the winding part and the inner part, the connection part extending obliquely between the winding part and the inner part, wherein the core is formed from metallic powder comprising pure iron particle having a size of about 50~200 μm, and a phosphate coating having a thickness of grater than zero and up to 100 nm thereon, wherein the core has a density of about 7~g/cc, and a partial density difference is greater than 0 g/cc and less than about 0.05 g/cc.

2. The core of claim 1, wherein the core is formed by subjecting the metallic powder and a polyamide-based lubricant to press molding at a temperature of about 70~100° C. and a pressure of about 7~11 ton/cm², followed by thermal treatment at about 500~600° C. for about 20~60 min.

3. The core of claim 1, wherein the winding part has a circular or oval cross-section.

4. The core of claim 1, wherein the height of the winding part is at least about 0.7 times the height of the inner part.

5. The core of claim 1, wherein a height of the outer part is equal to or greater than the height of the winding part but is lower than the height of the inner part.

6. The core of claim 1, further comprising a wire wound on the winding part.

\* \* \* \* \*